(No Model.)  2 Sheets—Sheet 1.

H. HARRISON.
GRAIN CONVEYER.

No. 259,387. Patented June 13, 1882.

WITNESSES
Fred. G. Dieterich
P. C. Dieterich

By his Attorney

INVENTOR
Henry Harrison
W. B. Richards (No Model.) 2 Sheets—Sheet 2.

H. HARRISON.
GRAIN CONVEYER.

No. 259,387. Patented June 13, 1882.

WITNESSES
Fred. G. Dieterich
P. C. Dieterich

By his Attorney

INVENTOR
Henry Harrison
W. B. Richards

UNITED STATES PATENT OFFICE.

HENRY HARRISON, OF BURLINGTON, IOWA, ASSIGNOR OF ONE-HALF TO LEWIS R. FIX, OF SAME PLACE.

GRAIN-CONVEYER.

SPECIFICATION forming part of Letters Patent No. 259,387, dated June 13, 1882.

Application filed April 8, 1881. (No model.)

*To all whom it may concern:*

Be it known that I, HENRY HARRISON, a citizen of the United States, residing at Burlington, in the county of Des Moines and State of Iowa, have invented certain new and useful Improvements in Grain-Conveyers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to grain-conveyers for delivering grain to and also from the bins in that class of buildings known generally as "elevators;" and the nature thereof consists, first, in troughs located one above and one below a series of bins, and provided with openings coinciding with the bins, whereby grain may be forced through the upper trough and delivered to either bin, as desired, and may be delivered from either bin to the lower trough, through which it may be forced for delivery to cars, vessels, or any desired receiver; second, in an endless belt passing around suitable pulleys or sprocket-wheels and provided with push-plates at suitable distances apart, and arranged within suitable troughs, one above and one below the bins, in such manner that the push-plates may force the grain along the upper trough for delivery to the bins and force it along the lower trough for delivery from the bins to cars, vessels, or other receivers.

A further feature in my invention consists in a push-plate attached at or about at its vertical central part to its carrying-belt, so that both of its sides are adapted to force grain along the trough, whereby one of its sides, when it is on an endless belt, will force the grain along a spout in one direction and its other side force the grain along a spout in the opposite direction, as hereinafter described.

A further feature consists in pulleys, over which the belt carrying the push-plate runs, having grooves or depressions which the side of each push-plate enters as it passes over the pulley.

The invention further consists in constructions and combinations hereinafter described, and set forth in the claims hereto annexed.

Figure 1:
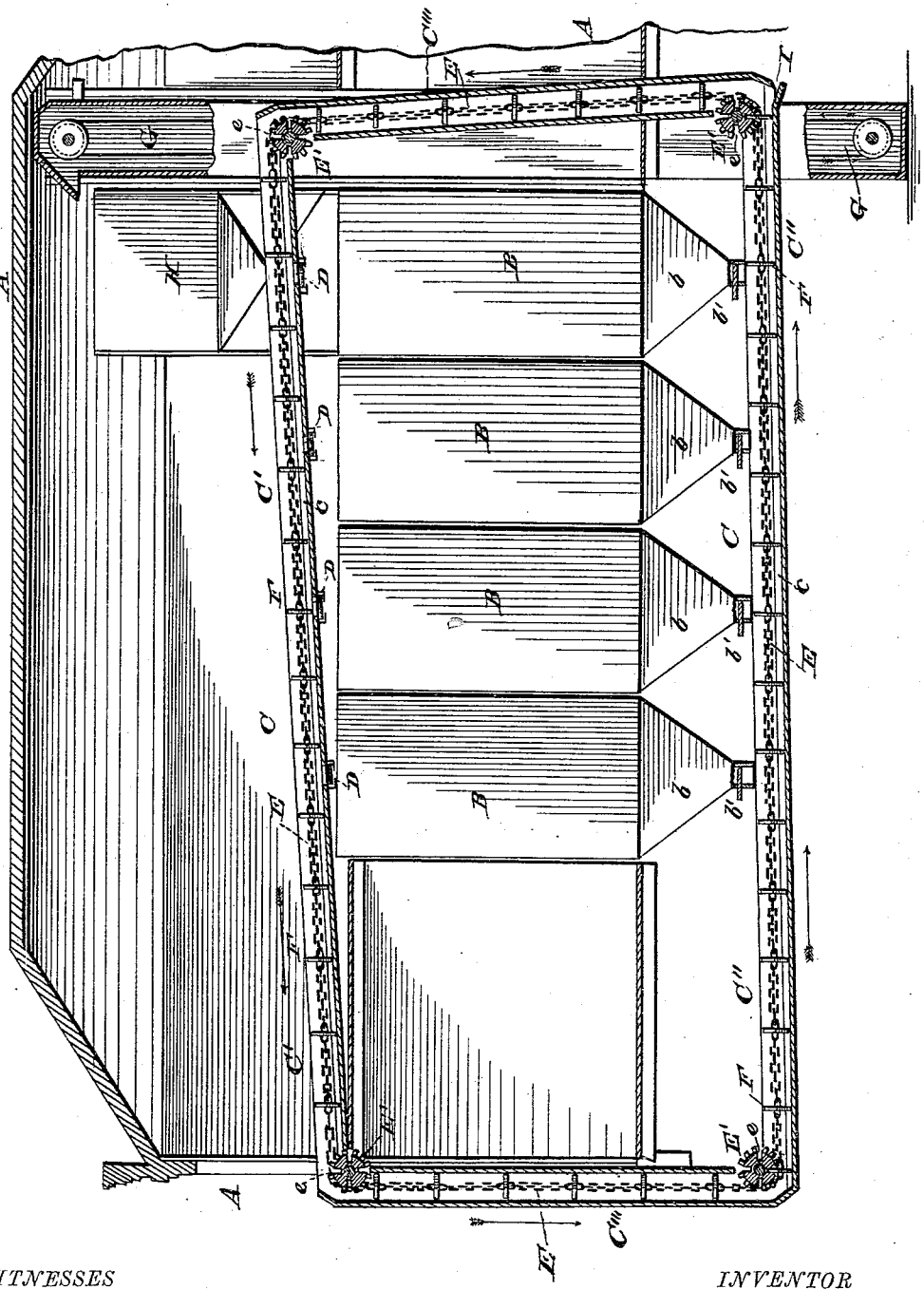
Figure 2:
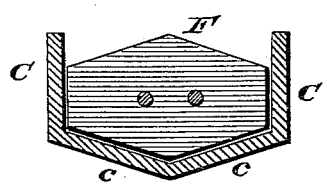
Figure 3:
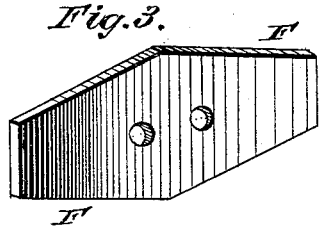
Figure 4:
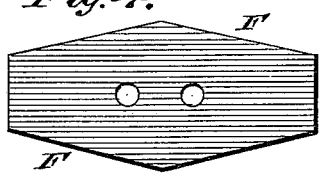
Figure 5:
Figure 6:
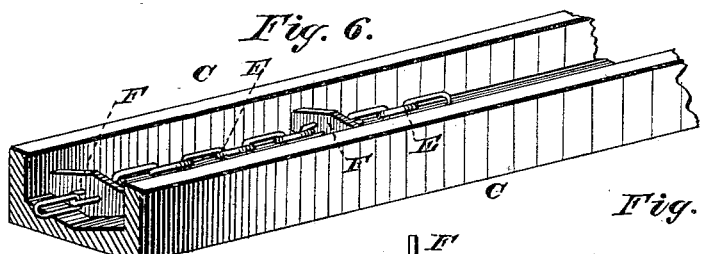
Figure 7:
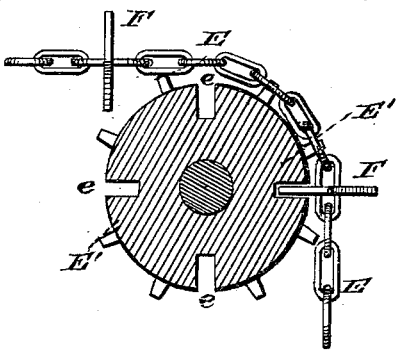

In the accompanying drawings, which illustrate my invention, Figure 1 is a vertical sectional elevation of an elevator-building and of a grain-conveyer located therein which embodies my invention. Fig. 2 is an enlarged transverse sectional elevation of the grain-trough. Fig. 3 is an enlarged perspective, and Fig. 4 an enlarged elevation, of one of the push-plates. Fig. 5 is a transverse section, showing a modification in the form of the conveyer-trough in its cross-section. Fig. 6 is a perspective of a short section of conveyer-trough with push-paddles and their carrying-belt. Fig. 7 is an enlarged sectional elevation of one of the pulleys, showing the depression or groove for the push-plates.

Referring to the drawings by letters, the same letter indicating the same part in the different figures, letters A represent parts of the frame-work of an ordinary elevator-building, which need not be described here, as it may be of any desired construction.

B B are grain-bins, open at their upper ends and having hopper-shaped lower ends, *b*, provided with slide or other valves *b'*.

C is the grain-conveyer trough, arranged with its upper portion, C', extending over and above each of the series of bins B and its lower portion, C'', extending along beneath the discharge-opening of each bin. End portions, C''', may connect the portions C' C'' or not, as desired. The portions C' C'' may extend horizontally across the series of bins; or they may be inclined at an angle from the horizontal. Suitable valved openings, D, are placed in the bottom of the trough C', one over each bin B, and the upper portion of same trough C' may be left open or closed. The upper portion of the part C'' of the trough may be entirely open; or it may be closed, except immediately beneath the discharge-openings of the respective bins. The bottoms of the conveyer-troughs are formed, as plainly shown at Fig. 2, V-shaped in cross-section, so that when the troughs contain but a small portion of grain it will tend to slide down the sloping sides *c* of the bottom and settle in the apex of the angle formed by these sloping sides. Other modifications of the form of the troughs in their transverse sections may be used, such as shown at Fig. 5; but I prefer the V-shaped bottom as being much the most effectual for the purpose intended, as hereinafter more fully described.

E is an endless chain belt, carried on and by sprocket-wheels E', one of which is located at each angle or bend of the conveyer-trough C, and either of which may be used as the drive-wheel to receive power from any suitable source and transmit the same to the belt E. The belt E extends through the troughs C' and C'', as shown at Fig. 1.

F are push-plates secured at short distances from each other on the belt E, one of the links of which passes through or is otherwise connected with each push-plate at or about at its central part. The special construction of the link by which the push-plate is secured to the chain belt is not claimed as my invention. The push-plates are formed diamond-shaped, as shown at Figs. 2, 3, and 4, so that either side of each plate conforms to the shape of the bottom of the conveyer-trough, as shown at Fig. 2, and, being connected to the endless chain, as described, at their central parts, both sides of the plates are adapted to push the grain along in the trough C, the one side of the push-plates forcing or pushing it along in the part C' and the other side pushing it along in the part C'', as is required to force the grain in opposite directions, by push-plates on a single belt in order to deliver grain to and carry it away from bins.

Each sprocket-wheel E' has grooves or depressions e parallel with its axis, into which the side of each push-plate may enter as it passes around the sprocket-wheel, in order to protect the push-plates from strain or damage in going over said wheels.

The grain may be delivered to the upper trough, C', for delivery to the bins in any desired manner. In the drawings a common bucket-elevator, G, is shown for the purpose, which delivers the grain in the ordinary manner to the ordinary hopper-scale, H, from which it may be allowed to run into the trough C', as desired. The push-plates F, moving in the direction shown by the arrows, will force the grain along in the trough C' and deliver it into any bin over which a valved opening, D, is arranged. By opening the valve at the bottom of either bin the grain therefrom will flow into the lower trough, C'', and be forced along the same to the opening I or any other suitable opening in the trough C'', from which it may be delivered to cars, ships, or other receivers.

The push-plates, constructed as shown at Fig. 2 or 5, or in any equivalent forms, will remove the grain very cleanly from the troughs, which conform in shape to the push-plates, as the grain will settle toward the lowest point in the cross-section of the trough and be removed cleanly therefrom by the lower central part of the push-plate, which projects down into and conforms to the shape of the bottom of the trough.

It will be seen that grain by this device may be delivered to and removed from the same bin at the same time, or may be delivered to one bin and removed from another at the same time, or may be delivered to either bin without removing grain from it or any other bin, or may be removed from either bin without delivering to it or any other bin at the same time.

Having thus described my invention, what I claim as new is—

1. In combination with a series of grain-bins, a trough having a V-shaped bottom located above said bins, through which grain may be forced for delivery to the bins, and a similarly-constructed trough located below the bins for receiving grain therefrom to be forced through said trough to the delivery or to a receiver, substantially as and for the purpose specified.

2. In combination with a series of grain-bins, a trough located above said bins, through which grain may be forced by push-plates on an endless belt for delivery to said grain-bins, and a trough located below the bins for receiving grain therefrom, through which trough the grain is forced also by push-plates on an endless belt to the delivery or to a receiver, substantially as and for the purpose specified.

3. The combination, with a series of grain-bins, a trough located above said bins, and a trough located below said bins, of an endless belt passing lengthwise through both of said troughs, provided with push-plates adapted to force the grain forward through one trough for delivery to the bins and through the other trough for removal from the bins, substantially as and for the purpose specified.

4. In a grain-conveyer, the combination, with a series of bins, of an upper trough adapted to deliver the grain to the bins, a lower trough adapted to receive the grain from the bins, an endless belt provided with push-plates for forcing the grain through both of said troughs, and pulleys or sprocket-wheels adapted to guide and drive the endless belt through the troughs, substantially as and for the purpose specified.

5. The trough C', extending over the bins B and provided with openings which register with said bins, and trough C'', extending below said bins, provided with valved openings in their bottoms, in combination with an endless belt, E, provided with push-plates F, adapted to propel the grain forward in the troughs, substantially as and for the purpose specified.

6. In combination with the troughs C' C'', endless belt with push-plates for propelling the grain forward in the troughs, and sprocket-wheels driving and changing direction of the belt; the bucket-elevator and hopper-scale adapted to deliver grain to the trough C', substantially as and for the purpose specified.

7. In a conveyer apparatus, the combination, with the upper and lower troughs and a carrier-belt passing through said troughs, of push-plates having the belt arranged through the middle of each, and having the opposite edges of each the same in contour, whereby not only is the belt carried clear of the troughs, but the push-plates rendered capable of working in either the upper or lower trough with equal facility.

8. The combination, with the belt of a conveyer apparatus, of push-plates projecting at both sides of the belt and having V-shaped working-edges, substantially as set forth.

9. In combination with a grain-conveyer trough above the series of grain-bins and a trough below said bins, said troughs having bottoms lowest at their central parts in their cross-sections, an endless belt provided with push-plates adapted to traverse both of said troughs, and which project from both sides of said belt and conform to the shape of the bottom of the troughs in their cross-section.

10. Diamond-shaped push-plates for propelling grain through conveyer-troughs.

11. A chain belt provided at intervals with diamond-shaped push-plates for propelling grain through conveyer-troughs.

12. A belt provided at intervals with diamond-shaped push-plates connected with said belt in such manner that both top and bottom sides of the push-plate project from the belt, so as to adapt either side for use, substantially as and for the purpose specified.

13. In combination with an upper and lower trough, C' C'', and passing through both of said troughs, an endless belt having diamond-shaped push-plates attached thereto in such manner that they project from both the upper and lower sides of the belt, and are thereby adapted to push the grain forward in one direction in the upper trough and in an opposite direction in the lower trough, substantially as and for the purpose specified.

14. The troughs C' C'' and endless belt E, having diamond-shaped push-plates F, in combination with the pulleys or sprocket-wheels for changing the direction of the belt and driving it, and with grain-bins B, substantially as and for the purpose specified.

15. In combination with an endless belt having diamond-shaped push-plates attached thereto so as to project from the belt, pulleys or sprocket-wheels over which the belt runs, having depressions or grooves which receive the projecting sides of the push-plates as they pass around the pulleys, substantially as and for the purpose specified.

In testimony whereof I affix my signature in presence of two witnesses.

HENRY HARRISON.

Witnesses:
A. W. PARSONS,
FRANK F. THUL.